Oct. 21, 1958  DE WITT C. CLINTSMAN  2,856,729
ANIMATED DUMMY
Filed Aug. 17, 1954   5 Sheets-Sheet 1

Inventor
DeWITT C. CLINTSMAN
By Gustave Miller
Attorney

Oct. 21, 1958 DE WITT C. CLINTSMAN 2,856,729
ANIMATED DUMMY
Filed Aug. 17, 1954 5 Sheets-Sheet 2

Inventor
DeWITT C. CLINTSMAN

By Gustave Miller
Attorney

Oct. 21, 1958  DE WITT C. CLINTSMAN  2,856,729
ANIMATED DUMMY
Filed Aug. 17, 1954  5 Sheets-Sheet 3
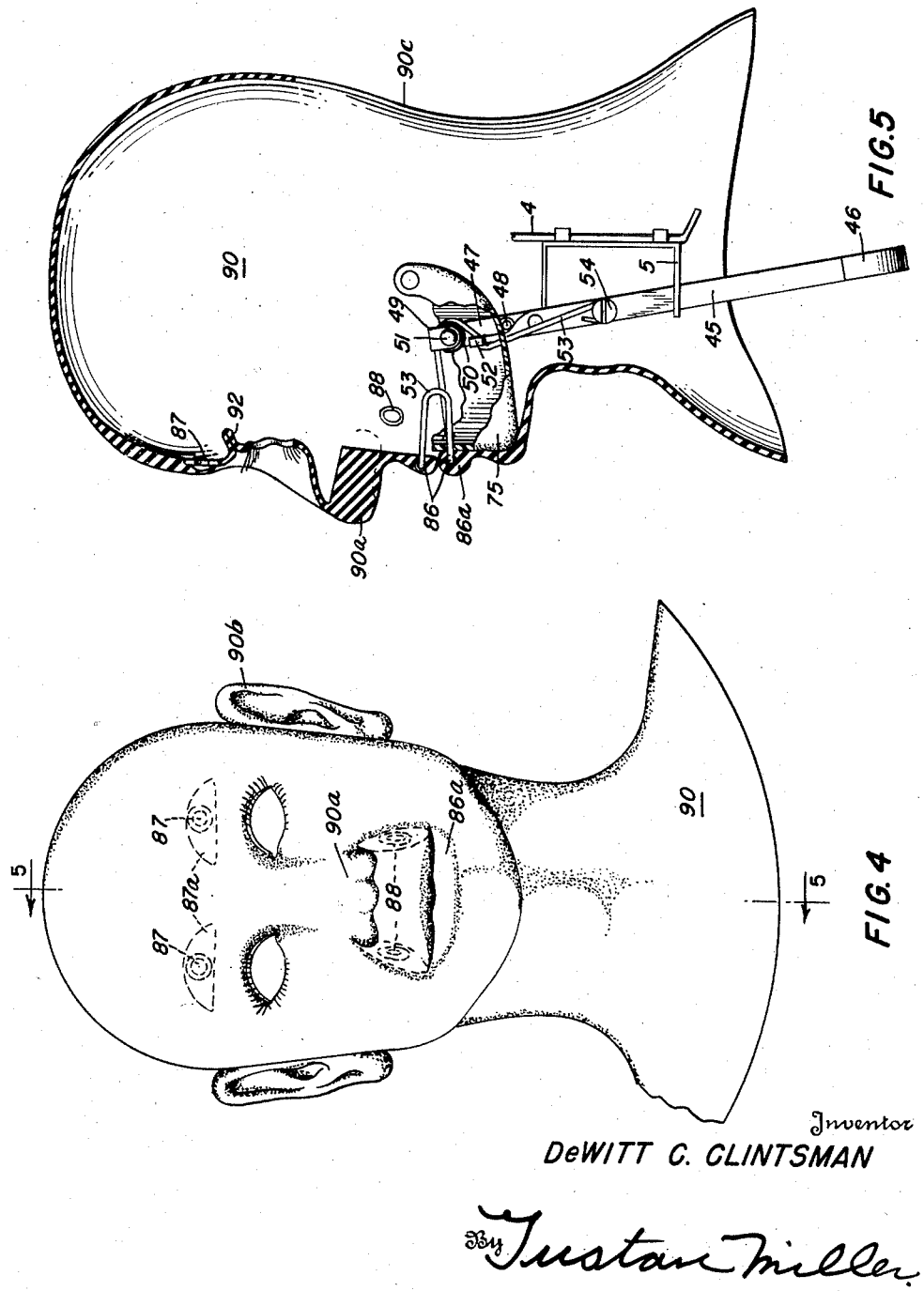
Inventor
DeWITT C. CLINTSMAN Oct. 21, 1958   DE WITT C. CLINTSMAN   2,856,729
ANIMATED DUMMY
Filed Aug. 17, 1954                    5 Sheets-Sheet 4
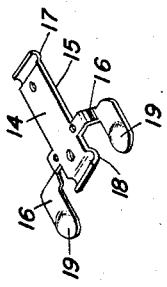
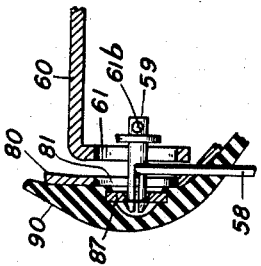
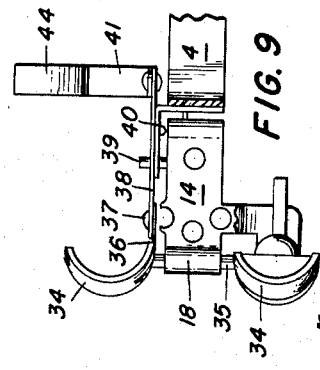
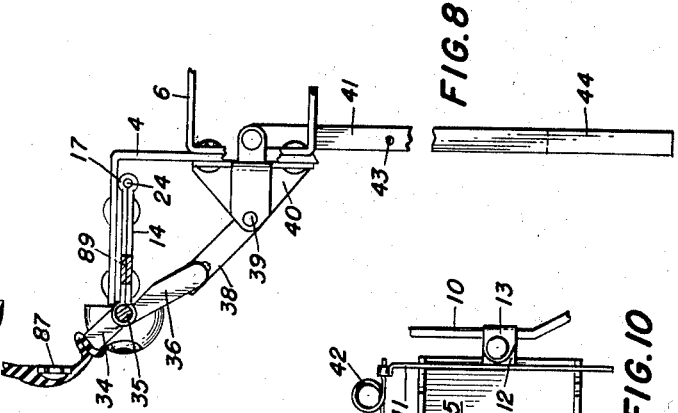
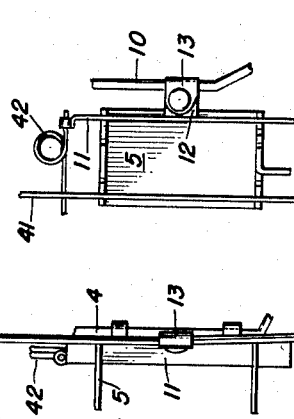
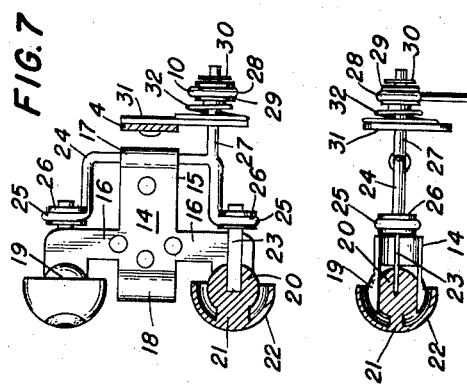
Inventor
DeWITT C. CLINTSMAN Oct. 21, 1958  DE WITT C. CLINTSMAN  2,856,729
ANIMATED DUMMY
Filed Aug. 17, 1954  5 Sheets-Sheet 5

Inventor
DeWITT C. CLINTSMAN
By Justin Miller
Attorney

United States Patent Office 2,856,729
Patented Oct. 21, 1958

2,856,729
ANIMATED DUMMY
De Witt C. Clintsman, Watertown, N. Y., assignor to Gustave Miller, Washington, D. C.
Application August 17, 1954, Serial No. 450,414
3 Claims. (Cl. 46—135)

This invention relates to the head and neck of an animated dummy or large doll with head and eye movements and facial expressions closely simulating real life. It is actuated by the right hand at a position between the shoulders. The arm and hand control the head movements while the thumb and four fingers control the eye, eyelid, jaw, lip, tongue and facial movements.

The invention includes a control mechanism within the head with control bars extending downward through a guide located in the neck and terminating in convenient shapes and positions between the shoulders. The parts in this mechanism are preferably made of metal and plastic, some parts being necessarily of one material and some the other, while some may be of either.

A second component unit of the invention is a plastic skull with angular brackets attached inside and secured by screws to corresponding brackets in the control mechanism. A plastic jaw is hinged to the skull.

The third component is a synthetic rubber covering or skin which covers the whole head, forms the neck and attaches to a shoulder form. The shoulder form is part of the body and does not comprise a part of this invention. This covering is of varying thicknesses and varying degrees of flexibility in different locations as required. And of course, it forms the ears, nose, mouth and eye openings and eyelids. Eye winkers must be "built in" while the eyebrows and a wig are added and are also not a part of this invention.

A primary object of this invention is to provide a more lifelike dummy for professional entertainers and in a somewhat smaller size for home and social amusement and entertainment by both children and adults. Much interesting amusement can be enjoyed in practicing the numerous combinations of movements coincident with the thoughts and words of the manipulator or the impressions provoked or inspired by others. With practice, these reactive movements will become natural and require no concentrated thought. The beneficial effects of that practice in coordination are not to be disregarded.

The head may be turned to any normal position by arm and hand movement. The eyes are controlled by the thumb because that is readily movable in any direction. The first finger operates the jaw and lips. A downward movement from the knuckle joint opens the mouth while a backward bend at the middle joint puckers the lips, slightly as in sounding "O," or fully as if whistling. The middle finger controls the facial expressions. A downward movement produces a scowl or frown by lowering the corners of the mouth and carrying the eyebrows downward and inward forming wrinkles between them. By moving the finger upward, the corners of the mouth are carried backward and upward, the cheeks bulged above and behind those points and the eyebrows raised in a smile. Continuing this movement, the upper lip bares the teeth, and by opening the mouth with the first finger a full laugh is produced. The third finger, being rather difficult to manipulate independently, is used little. Its only function is to protrude the tongue by a downward movement. The little finger winks the eyes and is used very frequently in a quick downward flip. For a wide-eyed expression it is moved upward. Provision is made for a connection between the thumb and little finger mechanisms to raise and lower the eyelids in synchronism with the eyes. By coordination of these finger movements, almost any human emotion can be expressed.

With the foregoing and other objects in view, this invention comprises the combination, construction and arrangement of parts hereinafter set forth, claimed, and disclosed in the accompanying drawings, wherein:

Figure 4 is a front view of the covering or skin;

Figure 5 is a cross sectional left side view, taken substantially along the line 5—5 of Figure 4, with the jaw and lip operating mechanism detailed;

Figure 6 is a side view of the eye manipulating mechanism;

Figure 7 is a top view of the structure shown in Figure 6;

Figure 8 is a side view of the eyelid manipulating mechanism;

Figure 9 is a top view of the structure of Figure 8;

Figure 10 is a plan view of the guide for all finger controls;

Figure 11 is an isometric view of one of the two identical eye and eyelid carrying members;

Figure 14 is an enlarged detail sectional view of the construction of the eyebrow control;

Figure 15:
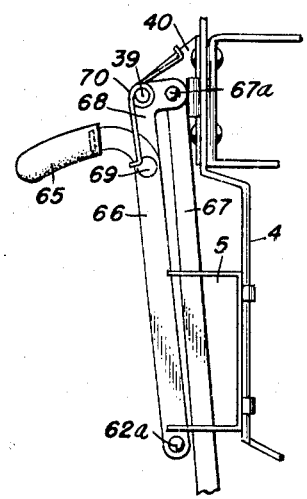
Figure 15 is a side view of the tongue manipulating mechanism.
Figure 17:
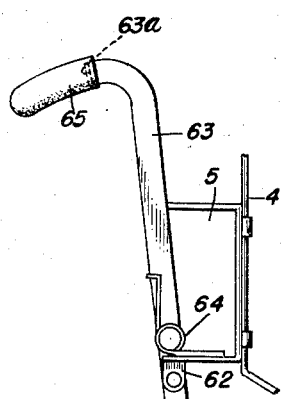
Figure 19:
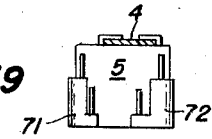
Figure 18:
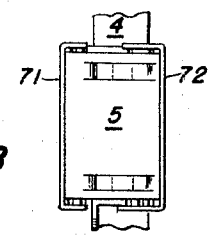
Figure 20:
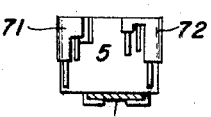

Figure 17 discloses an optional alternate to the structure of Figure 15;

Figure 18 is a front view of the control guide with control rod retainers installed;

Figure 19 is a top view of the structure of Figure 18;

Figure 20 is a bottom view of the structure of Figure 18.

Similar reference characters refer to similar parts throughout the several views of the drawings.

Figure 1:
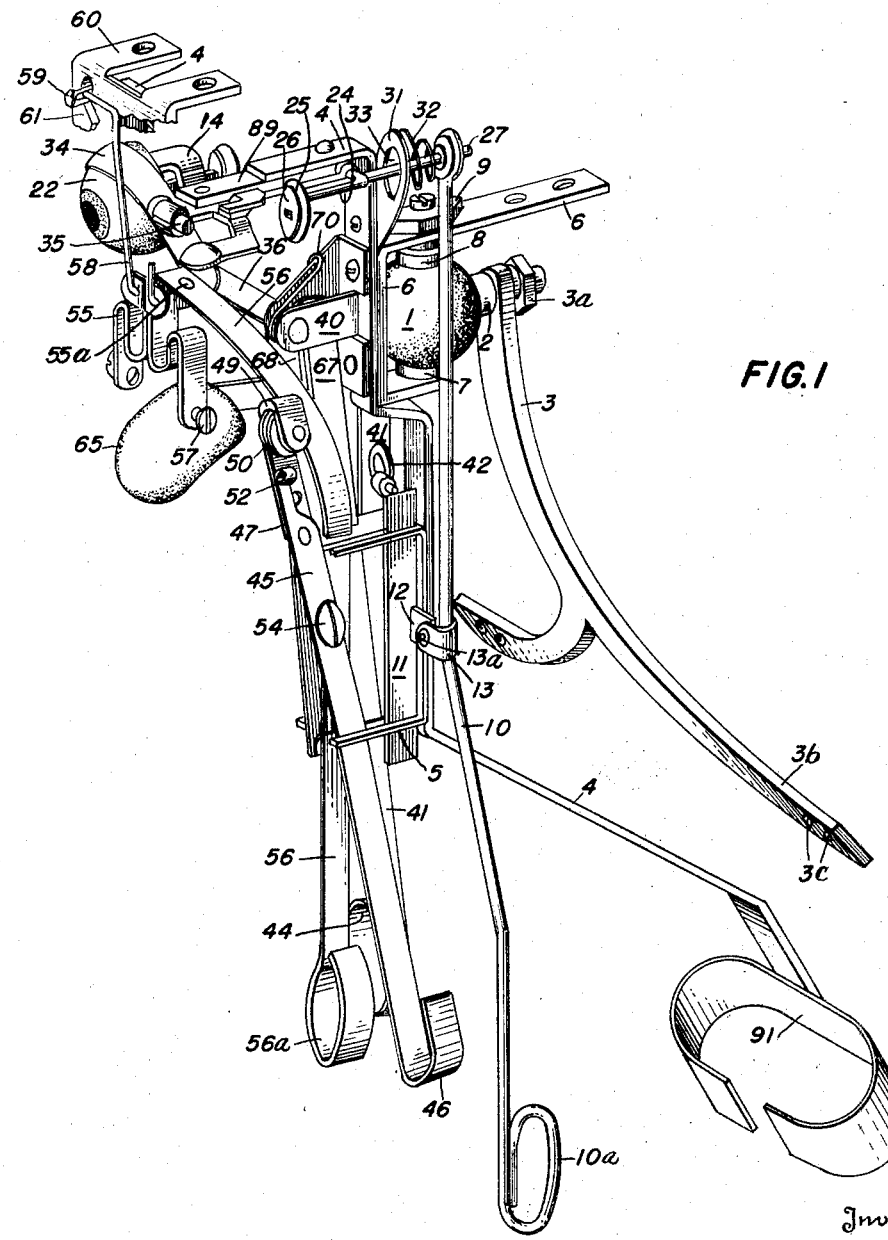
Figure 1 is an isometric view of the complete assembly of the working mechanism, parts thereof being broken away.

Referring now to the drawings in detail, Figure 1 shows a ball 1 which carries the head and entire mechanism and on which it all moves integrally. A shouldered extension 2 terminating in a threaded portion extends backward from the center of ball 1 and has secured thereto a forked bracket 3, as by a nut and lock washer 3a. The lower extremities 3b of forked bracket 3 are provided with holes 3c for riveting to a shouldered form.

The main mechanism carrying member 4 is formed from flat, ribbon-type sheet metal stock. Its entire form may be seen by referring to Figure 13 for its upper portion and to Figure 1 for the remainder. A hand receiving loop 91 is riveted across its lower end. All of the several mechanism carrying and guiding brackets are riveted to this member 4. Bracket 6 of the same material as member 4 is riveted to the rear side of member 4 and has two backward right angle bends. Both horizontal portions of bracket 6 are drilled through vertically at a distance rearward of the perpendicular portion sufficient for ball 1 to clear when its center is directly between the holes. Each of these two holes receives a stud-like member 7 and 8 with the face of its head concave to fit ball 1, thus forming a socket. Socket 7 has a plain, short shank and is peened over on the under side of the lower horizontal portion of bracket 6. Socket 8 has a longer shank threaded and with a screwdriver slot in its end. In assembling, ball 1 rests in socket 7 while socket 8 is screwed down against the ball to obtain the desired "feel" where it is locked by a nut 9.

Eye movement is controlled with the thumb inserted in the loop 10a at the lower end of a control wire 10. Referring to Figure 6, wire 10 is guided by a slide 11 which in turn is guided in slots in a guide bracket 5. A connecting lug 12 is bent to a right angle at the center of the inner edge of slide 11, and a corresponding lug 13 is soldered to wire 10. Lugs 12 and 13 are joined by a pin 13a.

The eyes are plastic and are shown in cross section in Figures 6 and 7. Their shape consists of a spherical center portion 20 which is connected by a web 21 to an outer portion 22 which is somewhat more than semispherical and open at its rear side. Web 21 is wide horizontally for strength and comparatively thin vertically for moving space upward and downward. A flat bar 23 is molded into the center of the center sphere 20 and extends straight backward. This flat bar 23 is also positioned with its wider portion horizontal.

The eyes are carried by two identical oppositely socketed stampings 14 (see Figure 11) matched together face to face (see Figures 6, 7, 8, and 9). Lateral projections 16 extend oppositely outward from the central portion 15 and each pair of mating projections turn diagonally outward from each other to a spacing somewhat less than the diameter of the center sphere 20 of the eyes. Then they turn forward at a right angle and have their forward ends 19 concaved at a radius in conformity to the radius of the sphere 20 of the eyes. As the two pieces 14 are placed together they receive the spheres 20, thus forming a ball and socket bearing for the eyes. A formed wire 24 is placed between the semi-circularly formed rear ends 17 of pieces 14. Wire 24 also forms two right angled forward bends at either side of pieces 14, which then extend outwardly at right angles and are formed into circular loops 25 at their ends. Since bars 23 pass through the centers of loops 25, the centers of these loops are slightly farther apart than the centers of the eyes to give the appearance of medium close vision rather than infinite. If it is desired to make a cross-eyed subject, it may be done by bending wire 24 to space loops 25 more widely apart. Rubber eyelets 26 with rectangular holes the size of flat bars 23 are inserted into loops 25 and bars 23 pass through these holes. The purpose of the flat bars and rectangular holes is to prevent the eyes from being rotated out of position. A short length of wire 27 is welded to the rearward side of the cross portion of formed wire 24 extending rearward in horizontal line and in such location that with the parallel portions of formed wire 24 equidistant from center and control wire 10 exactly perpendicular, the center lines of wire 27 and control wire 10 intersect. The upper end of control wire 10 is formed into a circular loop 28 which encircles a rubber eyelet 29 with a round hole in its center. Wire 27 passes through eyelet 29 and is grooved to accommodate a horseshoe washer 30 which is snapped in place just rearward of eyelet 29. The length of control wire 10 from the center of lug 13 to the center of loop 28 is such that with slide 11 midway in its vertical movement, the center of loop 28 is horizontal with the center line of the cross portion of formed wire 24. A bracket 31 is riveted to the upper end of the perpendicular portion of main member 4 and extends upwardly and to the left. A spiral spring 32 is attached to the rearward side of bracket 31 with its small end to the rear and encircling wire 27 closely forward from control wire 10. This spring 32 normally holds the eyes in a straight forward, horizontal position and any movement is in opposition to its tension. A round hole 33 in bracket 31 is of the correct size to allow ample eye movement but provide a safety stop in all directions as wire 27 contacts its periphery (see Figure 1).

Eye movement is in the same direction as thumb movement. In upward and downward movement, direction is reversed at formed wire 24 with its cross portion as fulcrum and reversed to original at the eye centers. In sidewise movements, direction is reversed in control wire 10 with lug 13 as fulcrum, and as formed wire 24 slides horizontally, reversal occurs at the eye centers. That is, since reversal at the eye centers is unavoidable, there must be a counter reversal to restore the original.

The eyelids 92 are controlled by the little finger and the mechanism is shown in Figures 8 and 9. Of course, the eyelids themselves are an integral part of a synthetic rubber covering or skin 90, which includes a simulated nose 90a, ears 90b, and lips 86a (see Figures 4 and 5). However, the directly activating part of the mechanism is in the form of a pair of semi-circular plastic arcs 34 precisely conforming to the radius of the eyes and joined integrally by a round bar-like portion 35 which spaces the arcs exactly as the eyes are spaced. The form is such that the center line of portion 35 intersects the centers of the eyes with the arcs 34 just to a non-rubbing clearance from the eyes. The round portion 35 is placed between the semi-circular forward ends 18 of the central portions 15 of pieces 14. Also integral with the plastic arc members 34 is an arm 36 inclined rearwardly and downwardly from the inner end of the right hand arc 34. Arm 36 has an integral projection 37 extending laterally to the right in the form of a headed pin to receive and retain the open end of an actuating arm 38. Arm 38 is angular and is carried at its center by a pin 39 in the forward end of bracket 40 which is attached to the forward side of main member 4 by the same rivets that attach bracket 6 to its opposite side. The rear end of arm 38 is jointed to the upper end of a finger bar 41 which passes straight downward through slots in guide bracket 5, then bends outward or to the right, as shown at 44, to accommodate the position of the little finger.

Figure 10 discloses the connection between eye control wire 10 and eyelid control bar 41. The front of guide bracket 5 is shown with eye control wire 10 and slide 11 at the right and eyelid control bar 41 at the left. One end of torsion spring 42 passes through a loop formed at the upper end of slide 11 and is secured in a horizontal position with solder. The other end of spring 42 passes through a small hole 43 in the center of bar 41. Thus, any upward or downward movement of wire 10 and slide 11 provides a like movement of bar 41 and eyelids 92, while any sidewise movement of the eyes has no effect on the lids since slide 11 does not move. To further accommodate the upward and downward movement of bar 41 in synchronism with wire 10, the finger loop 44 at the end of bar 41 is elongated perpendicularly so that movement may occur without carrying the little finger with it. Also, this provides a quicker wink when the little finger is flipped downward.

In assembling the eye and eyelid parts, all parts carried by the two identical pieces 14, namely the eyes, eyelid arc members 34 and formed wire 24 are placed into position in one of the two pieces 14. Then the matching piece is placed on and the two pieces riveted together in the holes at the bases of the lateral projections 19. These rivets are put in from top to bottom into countersunk holes and their flat heads must not come above the surface of piece 14. With these rivets peened and the assembly positioned with wire 27 through hole 33 in bracket 31 and spiral spring 32, two more rivets are passed upward through the holes in the center of the central portion of pieces 14, through a spacer 89 (see Figure 8) and through corresponding holes in the horizontal portion of main carrying member 4 where they are peened. Spacer 89 is to provide clearance beneath main member 4 for the semi-circular rear end of piece 14.

Figure 2:
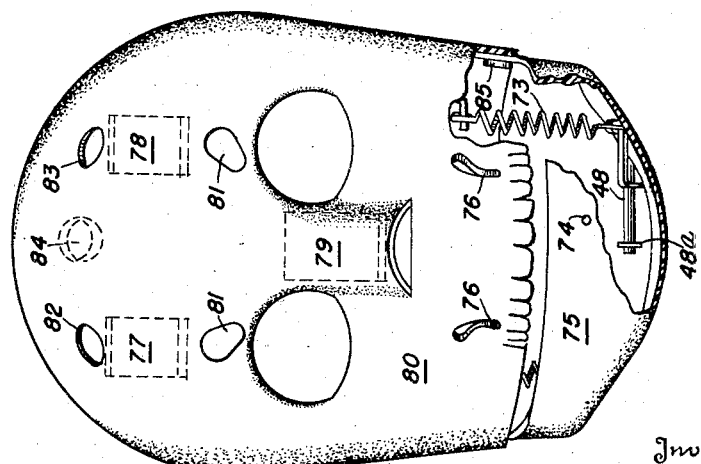
Figure 2 is a front view of the skull and jaw.

Jaw and lip movements (see Figures 2, 3 and 5) are operated by the index finger. The jaw 75 is hinged on two short pins 85 extending inwardly from opposite points near the center of the lower edge of the skull 80 (see Figures 2 and 3), and is held upward by two expansion coil springs 73. The jaw is shown in a slightly open position. The control mechanism is incorporated in Figure 5, a side view of the flexible resilient covering or skin 90 being shown in cross section to show the method of lip control. A control bar 45 includes a finger loop 46 and extends upwardly and diagonally forward through a slot in the lower horizontal portion of guide bracket 5 and forward of the upper horizontal portion. Immediately above this point bar 45 is pivoted to the lower end of short connecting bar 47 which is carried on a pin 48 (see Figure 2) attached to the left side of the jaw and extending horizontally inward. Connecting bar 47 continues the line of bar 45 upward and forward to a point directly behind the lips where it forms an inverted U-bend 49. A pulley 50 is installed in this U 49 by means of pin 51. Immediately above the junction of bar 45 and connecting bar 47, bar 45 narrows from the rear edge forward sufficiently to pass pin 48 and continues upward to a point just below pulley 50 where it bends outwardly into a small, closed circular loop or eye 52. In forming the skin 90, a small bore 86 is formed in the thick portion of the lips 86a completely encircling the mouth and having outlet on the inside of the lower lip where it coincides with a hole 74 in the front of the jaw (Figure 2). A string 53 of gut or plastic combining strength and flexibility is threaded around through the bore 86 of lips 86a with both ends entirely out of the outlet hole. The skin 90 is slit up the rear center to a point at the center of the back of the head as indicated at 90c by the cross section lining in Figure 5 to permit the insertion of the hand. In assembling, after skin 90 is placed on skull 80 it is turned upward inside out sufficiently to complete the assembly. The ends of strings 53 are then passed through hole 74 in the jaw and a shortened end clipped securely to the longer end with a suitable wire clip immediately rearward from hole 74. The longer end is then threaded rearwardly between the inverted U 51 and the top of pulley 50, forwardly beneath the pulley through eye 52, then downwardly and secured beneath the head of screw 54 in bar 45. The finger loop 46 in bar 45 has an open U top to allow a short bending of the finger at the middle joint. As this is done, the upper end of bar 45 is carried forward with the lower horizontal portion of guide bracket 5 as fulcrum. This carries the upper end of connecting bar 47 and pulley 50 backward with pin 48 as fulcrum. Thus a long pull on string 53 is afforded by the forward movement of eye 52 and the backward movement of pulley 50. Any degree of pull may be exerted from the sounding of "O" to the appearance of whistling. As is obvious, a downward pull on bar 45 from the knuckle joint pulls the jaw downward, opening the mouth. The double action of index finger bending with the consequent lip and jaw movement constitutes a part of the fascination in operating and the appearance of reality.

Figure 12:
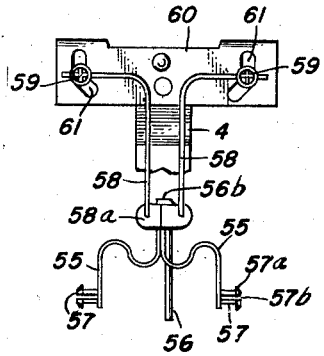
Figure 12 is a front view of the facial expression manipulating mechanism.
Figure 13:
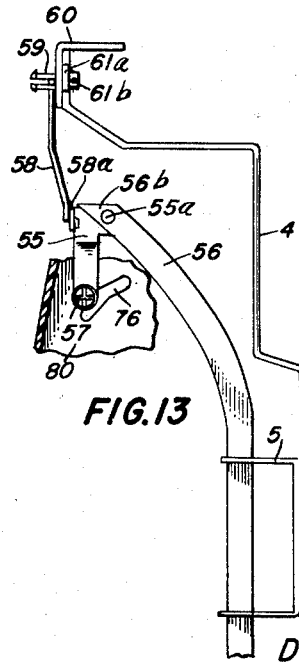
Figure 13 is a side view of the structure of Figure 12.

The middle finger operates the facial expressions. This mechanism, as shown in Figures 12 and 13, activates the corners of the mouth, the cheeks and the eyebrows. Reference must also be made to Figures 2, 3, 4, 5, and 14. The mouth corners and cheeks are activated by two identically shaped but right and left hand members 55 stamped from thin sheet spring steel stock. In Figure 13, these members 55 are angular in shape at the top with their rearwardly extending portions pivoted as at 55a to the upper end of a finger bar 56 terminating in a finger loop 56a. The extreme end of bar 56 is bent as at 56b to a right angle across the top of members 55. Thus as bar 56 is moved upward, members 55 are free to swing backward at their lower ends, but when bar 56 is moved downward, members 55 are carried with it in a fixed relative position. In Figure 12, members 55 extend downwardly, then outwardly and upwardly, then outwardly and downwardly in reverse U bends, bringing their lower ends into contact with the inner surface of the skull at points just above the teeth. Attached to the lower ends of members 55 are pins 57 extending outwardly. These pins have an abrupt step or shoulder 57a near their ends with the remainder of the ends tapered. Two thin slots 57b are milled into the center of these ends at right angles to each other to a depth that will allow an inward spring to the four quarters thus formed. When assembled, pins 57 pass outwardly through angular slots 76 in the skull 80 (Figures 2, 3, and 13, the latter showing a small portion of the skull 80). Two small washers 88 (see Figure 5) with tapered holes corresponding to the taper of pins 57 are molded into the skin at locations coinciding to those of the pins. In assembling, the thumb is held against the skin over the washer while a finger reaches through the opened mouth and snaps the pin into a locked position in the washer.

For controlling the eyebrows, forward extensions 58a (see Figures 12 and 13) at the upper ends of members 55 bend outwardly at right angles. Small holes through the centers of these extensions receive identical but right and left hand wires 58 with offset bends near their lower ends. These wires 58 extend upwardly and forwardly enough to clear the face of a bracket 60 which is riveted to the upward and forward end of main member 4. Wires 58 bend outwardly at right angles along the face of bracket 60. The ends of wires 58 pass through holes across the centers of pins 59 and the pins 59 and wires 58 are soldered together. The forward ends of pins 59 are identical to previously described pins 57. Pins 59 extend backward through elongated slots 61 in bracket 60, washers 61a are placed on the pins and small cotter pins or wires 61b are inserted in the holes through the pins to retain them in slots 61. Slots 61 are angular with their upper portions extending vertically and having their lower portions inclined downwardly and inwardly and are spaced apart to coincide with the approximate centers of the eyebrows. When the assembly is installed in the skull, pins 59 pass through holes 81 in the skull. Figure 14 is an enlarged detail of this construction and assembly, bracket 60 and portions of the skull 80 and skin 90 being shown in cross section. Washers 87 are molded into the skin at the approximate centers of the eyebrows and are snapped onto pins 59 just as described above in connection with pins 57, with the exception that here it is done by external pressure alone. The dotted lines in Figure 4 indicate the locations of the molded-in washers and areas 87a and 88. The areas 87a and 88 indicated in dotted lines are somewhat less flexible than elsewhere to avoid an exaggerated distortion of the skin at small localized points. That is, in a smile or laugh, portions extending from beside the nostrils to the corners of the mouth should move upward and backward with only partial flexibility. The same principle applies to the eyebrows.

It is obvious that a considerable degree of flexibility enters into the action of this expression mechanism. Spring members 55 are quite rigid in their forward and backward movement but flex easily to conform to the curvature of the skull. In the upward movement to produce a smile or laugh (Figures 12 and 13), pins 57 are guided upward and backward in their slots while pins 59 are guided straight upward raising the eyebrows. In the downward movement to produce a scowl, pins 57 are guided straight downward to droop the corners of the mouth while pins 59 carry the eyebrows downward and inward forming wrinkles between them. Although the direction of movement of all four pins is determined by their slots, their relative movement is determined partially by the flexibility of the skin itself as it opposes the flexibility of members 55 and wires 58. And the flexibility of the skin is the only provision for returning the mechanism to a neutral position when released.

Figure 16:
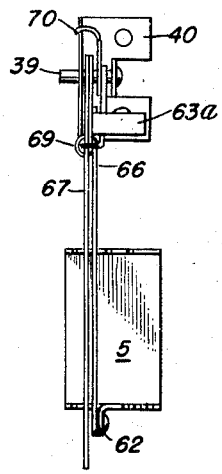
Figure 16 is a front view of Figure 15, the rubber tongue being omitted.

The third finger operates the tongue protruding mechanism, as shown in Figures 15 and 16. Figure 17 is an alternate form of construction. The third finger is rather difficult to manipulate independently and it becomes a matter of choice or opinion whether it can be more easily bent backward at the middle joint or downward at the knuckle joint. If the former is no less preferable for reasons of additional mobility of features, the much more simple construction of Figure 17 may be used. In Figure 17 a small portion 62 of the forward edge of the lower horizontal portion of guide bracket 5 is bent downward to a right angle to use as a fulcrum for a control bar 63. A torsion spring 64 is soldered to the upper surface of the lower portion of guide bracket 5 with its upper end hooked around the front edge of bar 63, holding the bar backward against the front edge of guide bracket 5. Bar 63 curves sharply forward near its upper end, then bends as at 63a to the left at a right angle. Rubber tongue 65 is molded onto this bent end. The position and shape of the tongue forms an arc with the fulcrum point of bar 63 as a radius. In Figure 15, finger and tongue bar 63 of Figure 17 is supplanted by a tongue bar 66 which terminates at its lower end at a point 62a corresponding to point 62 used as fulcrum for bar 63 in Figure 17. A finger bar 67 passes through slots in both upper and lower portions of guide bracket 5 and is pivotally connected at its upper end as by a pivot 67a to the rearward end of an angular arm 68 which is carried by pin 39 through the forward end of bracket 40. The lower end of angular arm 68 has an open U end which engages a pin 69 near the upper end of tongue bar 66. A torsion spring 70 encircles pin 39 and is hooked at its upper end around the front edge of arm 68 and bar 66. As finger bar 67 is pulled downward, it carries the lower end of angular arm 68 and the upper end of tongue bar 66 forward against the tension of spring 70.

Figures 18, 19 and 20 are front, top and bottom views respectively of guide bracket 5 with finger bar retainers 71 and 72 in place. These retainers are installed after all other mechanism assemblies are completed. They are formed to fit around the sides, top and bottom of the horizontal portions of guide bracket 5 with their forward edges flush with the forward edges of the bracket. Their horizontal portions have varying widths to coincide with the various positions of the finger bars. The retainers are secured in place with solder.

Figure 3:
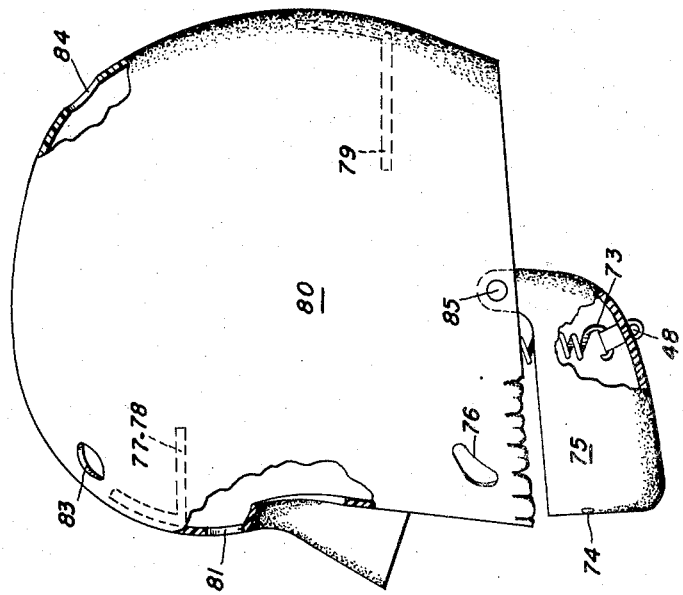
Figure 3 is a left side view of Figure 2.

The skull 80, Figures 2 and 3, has three angular brackets 77, 78 and 79 attached to its inner surface and bending inward horizontally. Holes for screws are drilled through these horizontal portions. In installing the operating mechanism in the skull, bracket 79 rests on the extended upper horizontal portion of bracket 6, Figure 1, while brackets 77 and 78 rest on the corresponding portions of bracket 60. All holes in the brackets 6 and 60 (Figure 1) are threaded for screws. Screwdriver access is provided by holes 82, 83 and 84 in the top of the skull.

The jaw is installed by placing connecting bar 47 onto pin 48 (Figures 5 and 2), as the jaw approaches position, placing the right side of the jaw onto its pin 85, then springing the left side inwardly enough to engage its adjacent pin 85. Then springs 73 are attached and horseshoe washer 48a is clipped onto pin 48. In installing the skin, the inner surfaces of the eyelids must be strongly adhered to the plastic arcs 34 which actuate them; this is done by any suitable method or process well known to the makers of synthetic rubber and plastic products. The teeth are merely integral forms of the lower edge of the skull. It seems that lower teeth are not required since the jaw would never show lower teeth in normal use. The slit in the skin at the back of the neck for assembly purposes may be held closed with an adhesive tape on the inside and show but little as most of it would be covered by the wig and shirt collar.

Rotative and vertical movement of the head may be effected by movement of the hand when passed through loop 91.

From the foregoing it will now be seen that there is herein provided an animated dummy which is adapted to a wide variety of facial expressions and movement of the head, eyes, lips, tongue and eyebrows, which accomplishes all of the objects of the invention and others, including many advantages of practical utility and high entertainment value.

As many embodiments may be made of this inventive concept and as many modifications may be made in the embodiments hereinbefore shown and described, it is to be understood that all matter herein is to be interpreted merely as illustrative and not in a limiting sense.

What is claimed is:

1. In an animated dummy the combination of an artificial skull having eye sockets therein, a jaw member pivoted to said skull, a flexible resilient skin covering said skull, said skin being formed with lips, eyebrows and eyelids, eyes movable in said eye sockets, a manually controlled operating mechanism positioned interiorly of said skull for moving said eyes, eyelids, jaw and lips, said means including control levers each terminating in a loop actuated independently by an individual finger, and additional independently controlled means for defining the contour of said lips, said last-mentioned means comprising a bore extending through said lips about the entire mouth, a flexible member extending through said bore, and finger controlled means for varying the tension exerted by said flexible member.

2. In an animated dummy the combination of an artificial skull having eye sockets therein, a jaw member pivoted to said skull, a flexible resilient skin covering said skull, said skin being formed with lips, eyebrows and eyelids, eyes movable in said eye sockets, a manually controlled operating mechanism positioned interiorly of said skull for moving said eyes, eyelids, jaw and lips, said means including control levers each terminating in a loop actuated independently by an individual finger, additional independently controlled means for defining the contour of said lips, said last-mentioned means comprising a bore extending through said lips about the entire mouth, a flexible member extending through said bore, finger controlled means for varying the tension exerted by said flexible member, and additional finger controlled means for varying the tension of the skin over the cheeks to vary the facial expression of said dummy.

3. In an animated dummy the combination of an artificial skull having eye sockets therein, a jaw member pivoted to said skull, a flexible resilient skin covering said skull, said skin being formed with lips, eyebrows and eyelids, eyes movable in said eye sockets, a manually controlled operating mechanism positioned interiorly of said skull for moving said eyes, eyelids, jaw and lips, independent means for raising and lowering said eyebrows, said means including control levers each terminating in a loop actuated independently by an individual finger, and additional independently controlled means for defining the contour of said lips, said last-mentioned means comprising a bore extending through said lips about the entire mouth, a flexible member extending through said bore, and finger controlled means for varying the tension exerted by said flexible member.

References Cited in the file of this patent

UNITED STATES PATENTS

| | | |
|---|---|---|
| 1,489,385 | Ciavatti | Apr. 8, 1924 |
| 1,974,366 | Pollock | Sept. 18, 1934 |
| 2,114,851 | McCown | Apr. 19, 1938 |
| 2,237,751 | Bunin | Apr. 8, 1941 |
| 2,548,237 | Pearson | Apr. 10, 1951 |
| 2,641,866 | Schiller | June 16, 1953 |
| 2,686,388 | Seidl | Aug. 17, 1954 |

FOREIGN PATENTS

| | | |
|---|---|---|
| 513,907 | France | Feb. 26, 1921 |